May 30, 1944.  A. OGREN  2,349,879
DEPTH AND TAPER GAUGE
Filed Dec. 27, 1941
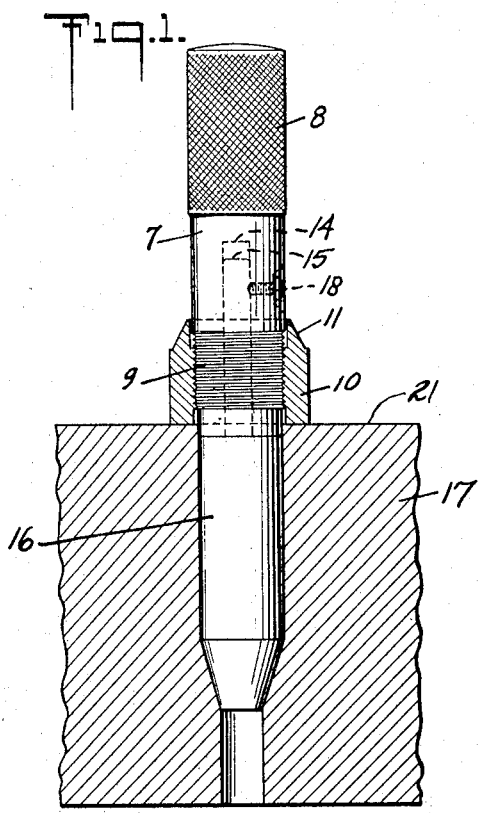
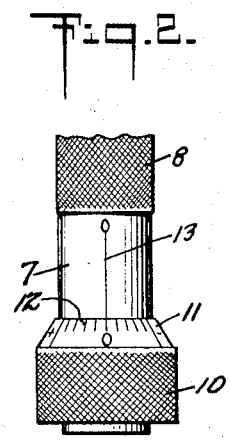
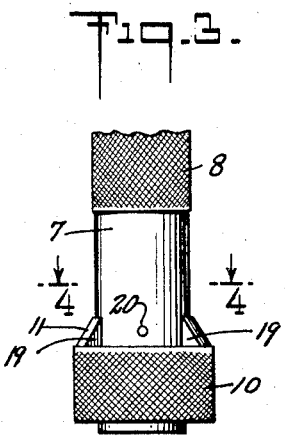
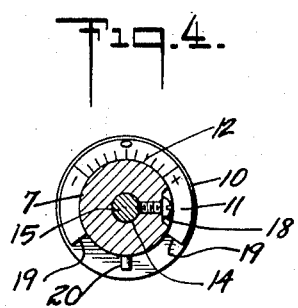
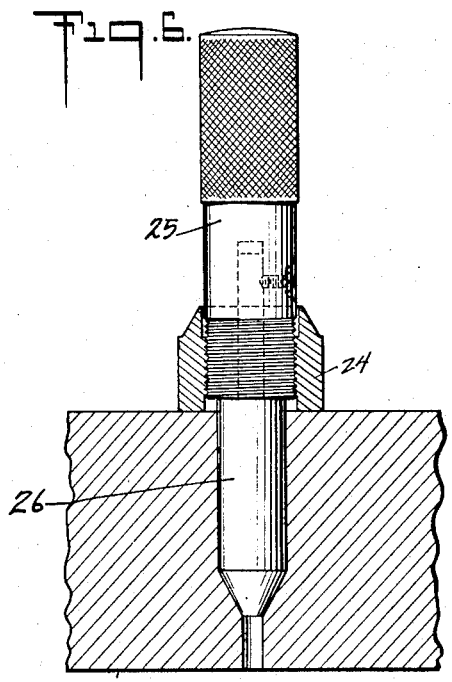
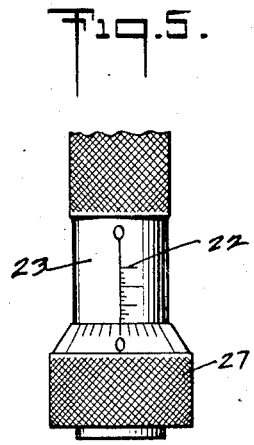
INVENTOR
*Arthur Ogren*
BY
*Emanuel Scheyer*
ATTORNEY Patented May 30, 1944

2,349,879

UNITED STATES PATENT OFFICE 2,349,879

DEPTH AND TAPER GAUGE

Arthur Ogren, New York, N. Y.

Application December 27, 1941, Serial No. 424,656

8 Claims. (Cl. 33—170)

This invention relates to a depth and taper gauge which can be used to measure various holes having a bottom taper or otherwise. The barrel is propelled axially during measurement by means of a ring threadedly mounted on it. In my preferred form, positive means are provided that the relative rotation between the barrel and ring is limited to the allowable plus and minus tolerance. The device is shown with a removable plug so that it can be used to measure holes of various predetermined sizes. Instead of using a removable plug the barrel can be extended to include the plug as one piece in which case the gauge can only be used to measure holes of one size.

Other objects and advantages will become apparent upon further study of the description and drawing, in which:

Fig. 1 is an elevation of the gauge with the removable plug attached, shown in a piece of work, the ring being in section.

Fig. 2 is a fragmental elevation of the gauge without the plug showing the zero line on the barrel and the graduations on the ring.

Fig. 3 is a fragmental elevation of the gauge as in Fig. 2, except that the view is taken on the opposite side of the gauge from the zero line.

Fig. 4 is a section taken along the line 4—4 of Fig. 3.

Fig. 5 is a fragmental elevation taken as in Fig. 2 of a modified form of the gauge, and Fig. 6 is an elevation taken as in Fig. 1 of still another modified form of the gauge.

Referring now to Figs. 1-4, a barrel 7 is provided with a knurled finger grip 8. The lower portion of barrel 7 is provided with micrometer thread 9. Engaging thread 9 is internally threaded ring 10. The upper edge 11 of ring 10 is beveled and has marked thereon graduations 12. Ring 10 is so mounted on barrel 7 that when the zero line on the former coincides with the zero line 13 on the barrel, the bottom of the barrel projects from ring 10. Barrel 7 is provided with hole 14 for receiving stem 15 of tapered plug 16 which is used to gauge the depth and taper of the hole in work 17. A set screw 18 is provided for holding stem 15 in barrel 7. Upper edge 11 of ring 10 is cut away to leave an arcuate gap whose ends are at 19. A pin 20 carried by barrel 7 projects into the gap. The distance between the ends 19 of the gap is sufficient to allow ring 10 to be turned past zero line 13 somewhat more than from its maximum allowed plus graduation to its maximum allowed minus graduation. These graduations are so located that they indicate the limit of the tolerance permitted in the depth and taper of the hole in work 17. Pin 20 and the gap in edge 11 are provided so that the gauge is always set to be in the range or zone of its predetermined tolerance.

When it is desired to test the accuracy of a hole and its taper, the gauge is set with its plug 16 in the hole. Ring 10 is then rotated so that when it rests on the outer surface 21 of the work, the plug seats in the taper in the hole. If this cannot be done within the limits of the predetermined tolerance, as indicated by not having the zero line 13 fall beyond the maximum plus and minus graduations 12, the piece is rejected.

Instead of using a pin 20 on the barrel and a gap in the ring to limit the location of barrel 7 automatically, it can be done manually as shown in Fig. 5. Axially spaced graduations 22 are provided on barrel 23 so that the depth desired can be based on any one of them as zero. The gauge of Fig. 5 is more flexible as to the range of hole sizes it may be used to test, but it is not as foolproof as the gauge of Fig. 1. Ring 27 is threadedly mounted on barrel 23.

The holes to be tested by the gauge of Fig. 1 must be equal or greater in diameter than that of barrel 7 because the latter extends below ring 10 when the test shows that the hole is within the limit of the tolerance. In order to be able to use a gauge of my type for holes smaller in diameter than the diameter of the barrel, a gauge of the kind shown in Fig. 6 may be used. Here ring 24 is so mounted on barrel 25 that it extends below the bottom of barrel 25 when the hole being tested is within the limit of the tolerance. A plug 26 can be used which is smaller in diameter than barrel 25, the plug being the only part of the gauge, unlike that shown in Fig. 1, which enters the hole. The bottom of barrel 25 is within ring 24.

Instead of using graduations 12 on the upper edge 11 of ring 10, a modified form of gauge can be used in which these graduations are omitted. In this case the amount of relative rotation between barrel 7 and ring 10 as limited by pin 20 contacting ends 19 of the gap in edge 11, is the measure of the tolerance. In other words, as long as ring 10 contacts the surface of the work while it is held within the limits of relative rotation set by pin 20 and ends 19, and the plug in the hole extends at the same time into contact with the work, the hole is correct within the predetermined allowance.

The term barrel as used in the claims is intended to include the plug which extends therefrom as well as a one piece barrel, unless inconsistent with the context.

I claim:

1. A gauge for measuring holes comprising a barrel, a ring threadedly mounted on the barrel, relative rotation of the barrel and ring producing relative axial motion of said barrel and ring, a zero index line on the barrel, and graduations including a zero line on the ring registering with the zero line on the barrel, upon said rotation, said graduations extending on either side of the zero line on the ring, said gauge indicating a theoretically correct hole in a piece of work when said zero lines are in register simultaneously with the ring contacting the surface of the work outside of the hole substantially adjacent thereto, and the barrel in the hole is extended into contact with the work, said ring being then entirely to one side of the extreme end of the barrel in the work, permitting measurement of holes in work of any lateral extent.

2. A gauge for measuring holes comprising a barrel, a ring threadedly mounted on the barrel, relative rotation of the barrel and ring producing relative axial motion of said barrel and ring, and means for holding the relative rotation of the barrel and ring within predetermined limits, said means engaging both the barrel and the ring to stop their relative rotation in both directions when said rotation exceeds a predetermined amount, said gauge indicating a correct hole within a predetermined tolerance when the ring can be made to contact the surface of the work outside of the hole substantially adjacent thereto, with the barrel in the hole extended into contact with the work, said ring being then entirely to one side of the extreme end of the barrel in the work, permitting measurement of holes in work of any lateral extent, the relative rotation, when said contacts are made, being a predetermined amount within said limits.

3. A gauge for measuring holes comprising a barrel, a ring threadedly mounted on the barrel, relative rotation of the barrel and ring producing relative axial motion of said barrel and ring, and means for holding the relative rotation of the barrel and ring within predetermined limits, said means having a portion fixed to the barrel and a portion fixed to the ring, said portion on the barrel blocking the relative motion of the ring when said rotation exceeds a predetermined amount in either direction, said gauge indicating a correct hole within a predetermined tolerance when the ring can be made to contact the surface of the work outside of the hole substantially adjacent thereto, with the barrel in the hole extended into contact with the work, said ring being then entirely to one side of the extreme end of the barrel in the work, permitting measurement of holes in work of any lateral extent, the relative rotation, when said contacts are made, being a predetermined amount within said limits.

4. A gauge for measuring holes comprising a barrel, a ring threadedly mounted on the barrel, relative rotation of the barrel and ring producing relative axial motion of said barrel and ring, a projection on said barrel and detent means on the ring, the projection on the barrel engaging the means on the ring to block said rotation when it exceeds a predetermined limit in either direction, said gauge indicating a correct hole within a predetermined tolerance when the ring can be made to contact the surface of the work outside of the hole substantially adjacent thereto, with the barrel in the hole extended into contact with the work, said ring being then entirely to one side of the extreme end of the barrel in the work, permitting measurement of holes in work of any lateral extent, the relative rotation, when said contacts are made, being a predetermined amount within said limits.

5. A gauge for measuring holes comprising a barrel, a ring threadedly mounted on the barrel, relative rotation of the barrel and ring producing relative axial motion of said barrel and ring, a plug extending from one end of the barrel and means for removably fastening the plug to the barrel, said means permitting the attachment of different sized plugs, said gauge indicating a correct hole when the ring contacts the surface of the work outside of the hole substantially adjacent thereto, with the plug in the hole extended into contact with the work and the ring is in a predetermined position on the barrel, said ring being then entirely to one side of the extreme end of the barrel in the work, permitting measurement of holes in work of any lateral extent.

6. A gauge for measuring holes comprising a barrel, a ring threadedly mounted on the barrel thereof, relative rotation of the barrel and ring producing relative axial motion of said barrel and ring, said gauge indicating a correct hole when the ring contacts the surface of the work outside of the hole substantially adjacent thereto, with the barrel in the hole extended into contact with the work and the ring is in a predetermined position on the barrel, said ring being then entirely to one side of the extreme end of the barrel in the work, permitting measurement of holes in work of any lateral extent.

7. A gauge for measuring holes comprising a barrel member, a ring member threadedly mounted on the barrel member, relative rotation of the barrel and ring members producing relative axial motion of said members, a zero index line on one of the members, and graduations including a zero line on the other of the members registering with the zero line of the former member upon said rotation, said graduations extending on either side of the zero line on said other member, said gauge indicating a theoretically correct hole in a piece of work when said zero lines are in register simultaneously with the ring member contacting the surface of the work outside of the hole, and substantially adjacent thereto and the barrel member in the hole is extended into contact with the work, said ring being then entirely to one side of the extreme end of the barrel in the work, permitting measurement of holes in work of any lateral extent.

8. A gauge for measuring a hole extending inward from a surface adjacent the hole substantially at right angles to the axis of the hole, said gauge comprising a barrel, a ring threadedly mounted on the barrel, relative rotation of the barrel and ring producing relative axial motion of said barrel and ring, the ring having an edge lying in a plane substantially at right angles to the longitudinal axis of the barrel, said gauge indicating a correct hole when said edge of the ring contacts the surface of the work outside of the hole substantially adjacent thereto and the barrel in the hole is extended into contact with the work, said edge of the ring being then entirely to one side of said surface to permit measurement of holes in work of any lateral extent.

ARTHUR OGREN.